United States Patent [19]

Reich et al.

[11] Patent Number: 5,516,860
[45] Date of Patent: May 14, 1996

[54] PREPARATION OF RADIATION-CURABLE ACRYLATES

[75] Inventors: Wolfgang Reich, Maxdorf; Ulrich Jäger, Harthausen; Erich Beck, Schriesheim; Edmund Keil, Heuchelheim; Ulrich Erhardt, Ladenburg; Adolf Nuber, Böhl-Iggelheim, all of Germany

[73] Assignee: BASF Aktiengesellschaft, Ludwigshafen, Germany

[21] Appl. No.: 432,063

[22] Filed: May 1, 1995

[30] Foreign Application Priority Data

May 4, 1994 [DE] Germany .................. 44 15 624.3

[51] Int. Cl.$^6$ .................................................. C08F 283/00
[52] U.S. Cl. .................. 525/531; 525/107; 525/165; 525/374; 525/423; 525/438; 525/529; 525/532; 525/533; 525/922
[58] Field of Search ................................ 525/107, 165, 525/374, 423, 438, 529, 531, 532, 533, 922

[56] References Cited

U.S. PATENT DOCUMENTS

| | | | |
|---|---|---|---|
| Re. 34,766 | 10/1994 | Merz et al. | 523/412 |
| 3,925,349 | 12/1975 | Gaske | 204/159.15 |
| 3,979,270 | 9/1976 | Trecker et al. | 528/75 |
| 4,588,788 | 5/1986 | Emmons et al. | 525/530 |

FOREIGN PATENT DOCUMENTS

| | | |
|---|---|---|
| 0054105 | 6/1982 | European Pat. Off. . |
| 0188752 | 7/1986 | European Pat. Off. . |
| 0211978 | 3/1987 | European Pat. Off. . |
| 0279303 | 8/1988 | European Pat. Off. . |
| 0280222 | 8/1988 | European Pat. Off. . |
| 2346424 | 4/1974 | Germany . |
| 3316593 | 11/1984 | Germany . |

*Primary Examiner*—Melvyn I. Marquis
*Assistant Examiner*—Randy Gulakowski
*Attorney, Agent, or Firm*—Oblon, Spivak, McClelland, Maier & Neustadt

[57] ABSTRACT

Radiation-curable acrylates are prepared by a process in which, in a 1st stage, a hydroxy compound is reacted with acrylic acid or methacrylic acid and, in or before a 2nd stage, the reaction product of the 1st stage is then reacted with an epoxy compound and compounds having one or more primary or secondary amino groups are added in the 2nd stage and the reaction in the 2nd stage is continued, after the addition of these compounds, until the acid number of the reaction mixture has decreased by at least 3 mg KOH/g of reaction mixture from the time of the addition of these compounds.

6 Claims, No Drawings

PREPARATION OF RADIATION-CURABLE ACRYLATES

The present invention relates to a process for the preparation of radiation-curable acrylates. EP-A-54 105, DE-A 33 16 593 and EP-A-27 93 303 disclose processes in which, in a first stage, a (meth)acrylate is prepared from (meth)acrylic acid and a hydroxy compound and, in a second stage, excess (meth)acrylic acid is reacted with an epoxide.

EP-A-280 222 (O.Z. 0050/38998), DE-A-23 46 424 and EP-A-211 978 disclose that the reactivity of acrylates can be increased by adding compounds having primary and/or secondary amino groups. The amino groups undergo addition at the double bonds of the acrylates (Michael addition). In the case of the above acrylates prepared in two stages, the addition of amine leads to a sharp increase in the viscosity, with the result that the requirement for reactive diluents is increased to an undesirable extent.

It is an object of the present invention to provide a process for the preparation of amine-modified acrylates in a two-stage procedure, ie. reaction of (meth)acrylic acid with a hydroxy compound and subsequent reaction with an epoxide, in which the reaction product has a very low viscosity.

We have found that this object is achieved by a process for the preparation of radiation-curable acrylates, wherein, in a 1st stage, a hydroxy compound is reacted with acrylic acid or methacrylic acid and, in a 2nd stage, the reaction product of the 1st stage is subsequently reacted with an epoxy compound and compounds having one or more primary or secondary amino groups are added in or before the 2nd stage and, after the addition of these compounds, the reaction of the 2nd stage is continued until the acid number of the reaction mixture has decreased by at least 3 mg KOH/g of reaction mixture from the time of addition of these compounds.

We have also found the acrylates obtained by this process and their use in coating materials.

In a 1st stage of the novel process, acrylic acid or methacrylic acid (referred to by the overall term (meth)acrylic acid), preferably acrylic acid, is reacted with a hydroxy compound. Suitable hydroxy compounds are compounds having one or more hydroxyl groups. Examples are monoalcohols, for example alkanols or alkoxylated alcohols with a remaining OH group, $C_2$–$C_8$-alkylenediols, trimethylpropane, glycerol or pentaerythritol, or, for example, hydroxyl-containing compounds alkoxylated with ethylene oxide or propylene oxide.

Preferred hydroxy compounds are saturated polyesters which contain at least 2, in particular 2 to 6, free hydroxyl groups and may also contain ether groups, or polyethers having at least 2, in particular 2 to 6, free hydroxyl groups.

The molecular weights $M_n$ of the polyesters or polyethers are preferably from 100 to 4000 ($M_n$ determined by gel permeation chromatography).

Such hydroxyl-containing polyesters can be prepared, for example, in a conventional manner by esterification of dicarboxylic acids or polycarboxylic acids with diols or polyols. Starting materials for such hydroxyl-containing polyesters are known to a person skilled in the art.

Succinic acid, glutaric acid, adipic acid, sebacic acid, o-phthalic acid, isomers and hydrogenation products thereof and esterifiable derivatives, such as anhydrides, eg. maleic anhydride, or dialkyl esters of the stated acids may preferably be used as dicarboxylic acids. Examples of polycarboxylic acids and their anhydrides are trioic or tetraoic acids, such as trimellitic anhydride or benzenetetracarboxylic acid.

Preferred diols are ethylene glycol, 1,2- and 1,3-propylene glycol, 1,4-butanediol, 1,6-hexanediol, neopentyl glycol, cyclohexanedimethanol and polyglycols of the ethylene glycol and propylene glycol type.

Examples of polyols are primarily trimethylolpropane, glycerol and pentaerythritol.

Other suitable diols or polyols are diols or polyols which are oxyalkylated (for example with ethylene oxide or propylene oxide), in particular having a degree of oxyalkylation of from 0 to 10, based on the particular hydroxyl groups of the diol or polyol.

The polyesterols to be used according to the invention include polycaprolactonediols and polycaprolactonetriols, the preparation of which is likewise known to a person skilled in the art.

Examples of suitable hydroxyl-containing polyethers are those which can be obtained by known processes, by reacting dihydric and/or polyhydric alcohols with various amounts of ethylene oxide and/or propylene oxide. Polymerization products of tetrahydrofuran or of butylene oxide may also be used.

Preferred hydroxyl-containing polyethers are oxyalkylation products of the abovementioned diols or polyols, in particular having a degree of oxyalkylation of from 0 to 10, particularly preferably from 1 to 10, based on the particular hydroxyl groups of the diol or polyol, a total of at least 2 alkoxy groups, however, being present in the polyether.

In the esterification of the (meth)acrylic acid in the case of the hydroxyl-containing polyester, it is, for example, also possible initially to take the (meth)acrylic acid together with starting materials of the hydroxyl-containing polyester, for example dicarboxylic acids or anhydrides thereof and diols or polyols and to react the starting materials together with the (meth)acrylic acid in one stage.

In the esterification of (meth)acrylic acid with the hydroxy compound, preferably from 0.1 to 1.5, particularly preferably from 0.5 to 1.4, and very particularly preferably from 0.7 to 1.3, equivalents, based on 1 hydroxyl equivalent of the hydroxy compounds, of (meth)acrylic acid are used. In the abovementioned case where the starting materials, for example of the hydroxyl-containing polyester, are used in the esterification, the number of equivalents of the (meth)acrylic acid is based on the number of hydroxyl equivalents theoretically remaining after the reaction of the starting materials, for example the reaction of dicarboxylic acids with diols or polyols.

The reaction of the (meth)acrylic acid with the hydroxy compounds can be carried out, for example, in the presence of an acidic esterification catalyst, eg. sulfuric acid or p-toluenesulfonic acid, and in the presence of a hydrocarbon which forms an azeotropic mixture with water, in particular to a conversion of, in particular, at least 85%, preferably from 90 to 95%, of the hydroxyl groups of the hydroxy compound, for example at from 60° to 140° C. The water of reaction formed is removed azeotropically. Suitable hydrocarbons are aliphatic and aromatic hydrocarbons, for example alkanes and cycloalkanes, such as n-hexane, n-heptane and cyclohexane, aromatics, such as benzene, toluene and xylene isomers, and special gasolines which boil within a range from 70° to 140° C.

In order to avoid premature polymerization, the reaction with (meth)acrylic acid is advantageously carried out in the presence of small amounts of inhibitors. These are the conventional compounds used for preventing thermal polymerization, for example of the hydroquinone, the hydroquinone monoalkyl ether, the 2,6-di-tert-butylphenol, N-nitrosoamine, the phenothiazine or the phosphorous ester type.

They are used in general in amounts of from 0.001 to 2.0%, preferably from 0.005 to 0.5%, based on the reaction in the first stage.

After the esterification, the solvent, for example the hydrocarbon, can be removed from the reaction mixture by distillation, under atmospheric or reduced pressure. The esterification catalyst can be neutralized in a suitable manner, for example by adding a tertiary amine or alkali metal hydroxide. Furthermore, excess (meth)acrylic acid can be partially removed, for example by distillation under reduced pressure. The reaction product of the 1st stage generally still has an acid number above 25, in particular from 35 to 100, mg KOH/g of substance (without solvent) before the beginning of the reaction in the 2nd stage.

In the 2nd stage, the reaction product obtained in the 1st stage is reacted with an epoxy compound. Epoxy compounds are those having at least one epoxy group, preferably at least two, preferably two or three, epoxy groups in the molecule.

For example, epoxidized olefins, glycidyl esters of saturated or unsaturated carboxylic acids or glycidyl ethers of aliphatic or aromatic polyols are suitable. Such products are commercially available in large numbers. Polyglycidyl compounds of the bisphenol A type and glycidyl ethers of polyfunctional alcohols, for example of butanediol, of glycerol and of pentaerythritol, are particularly suitable. Examples of such polyepoxy compounds are ®Epikote 812 (epoxide value: about 0.67) and Epikote 828 (epoxide value: about 0.53) and Epikote 162 (epoxide value: about 0.61) from Shell.

The epoxy compounds are added in amounts of from 1 to 20, particularly preferably from 5 to 15, % by weight to the reaction product obtained in the 1st stage. The epoxy compounds are very particularly preferably used in roughly equimolar amounts, based on the number of acid equivalents that are still present in the reaction product of the 1st stage.

In the reaction with epoxy compounds in the 2nd stage, acid which is used in excess or is unconverted, in particular (meth)acrylic acid, as well as, for example, dicarboxylic acid still present as starting material in the mixture or resulting half-esters of dicarboxylic acids having a remaining acid group are bound as epoxy esters.

The reaction with epoxy compounds is carried out at preferably from 90° to 130° C., particularly preferably from 100° to 110° C., and preferably until the reaction mixture has an acid number of less than 5 mg KOH/g.

For example, quaternary ammonium or phosphonium compounds, tertiary amines, phosphines, such as triphenylphosphine, or Lewis bases, such as thiodiglycol, may be used as catalysts for the reaction of the epoxy compounds with the acid groups in the 2nd stage.

The catalysts are preferably used in amounts of from 0.01 to 5, particularly preferably from 0.1 to 3% by weight, based on the epoxy compounds.

During the reaction with the epoxy compounds in the 2nd stage, compounds having one or more primary or secondary amino groups are added to the reaction mixture.

The number of amine hydrogen atoms (N—H) of primary or secondary amines in the case of these compounds is preferably from 1 to 6, preferably from 2 to 4.

For example, the number of amine hydrogen atoms is 4 in the case of a compound having two primary amino groups and 3 in the case of a compound having one primary and one secondary amino group.

Primary or secondary amino groups undergo a Michael addition reaction with acrylate groups:

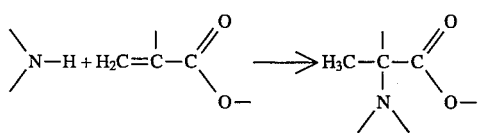

Primary amino groups thus become secondary amino groups, which in turn can undergo addition with acrylate groups with formation of tertiary amino groups.

Suitable compounds having primary or secondary amino groups are generally low molecular weight compounds and preferably have a molecular weight of less than 1000.

Examples are primary monoamines, such as $C_1$–$C_{20}$-alkylamines, in particular n-butylamine, n-hexylamine, 2-ethylhexylamine and octadecylamine, cycloaliphatic amines, such as cyclohexylamine, and amines containing (hetero)aromatic groups, such as benzylamine, 1-(3-aminopropyl)imidazole and tetrahydrofurfurylamine.

Compounds having 2 primary amino groups are, for example, $C_1$- or $C_2$-alkylenediamines, such as ethylenediamine, butylenediamine, neopentanediamine or hexamethylenediamine.

Other examples are 4,9-dioxadodecane-1,12-diamine, 4,7,10-trioxatridecane-1,13-diamine, and 4,4'-diaminodicyclohexylmethane. Examples of amines having hydroxyl groups are alkarolamines, eg. ethanolamine, tert-propanolamine, aminoethoxyethanol, aminoethylethanolamine, 2-aminopropanol, 2-aminobutanol, etc.

Compounds having primary and secondary amino groups are, for example, 3-amino-1-methylaminopropane, diethylenetriamine, dipropylenetriamine and N,N'-bis(3-aminopropyl)ethylenediamine.

The compounds having one or more primary or secondary amino groups are preferably used in amounts such that there is from 0.005 to 0.4, preferably from 0.1 to 0.3, mol of amine hydrogen atoms of primary or secondary amino groups per mole of acrylate groups.

The compounds having primary or secondary amino groups are added to the reaction mixture in or before the 2nd stage, and the reaction in the 2nd stage is then continued until, after the addition of the compounds having primary or secondary amino groups, the acid number decreases by at least 3, preferably at least 4, mg KOH/g of reaction mixture from the time of addition of these compounds.

The compounds having primary or secondary amino groups are preferably added at an acid number of the reaction mixture of from 8 to 80, particularly preferably from 9 to 35, mg KOH/g. The addition is preferably carried out during the reaction in the 2nd stage. The latter reaction is then preferably terminated when the acid number has decreased to below 5 mg KOH/g.

The radiation-curable acrylates obtainable by the novel process have a low viscosity, with the result that in particular the requirement for reactive diluents for establishing viscosities suitable for processing is reduced.

The radiation-curable acrylates obtainable by the novel process are particularly suitable for use as or in materials which can be cured thermally, but preferably by high-energy radiation.

The materials can be used as or in coating materials, for example finishes, printing inks or adhesives, as printing plates, as moldings, for the production of photoresists, in stereolithography or as molding material, for example for optical lenses.

For use as or in radiation-curable materials, for example, additives such as crosslinking agents, thickeners, leveling agents or fillers or pigments, etc., may be added to the radiation-curable acrylates (referred to below as radiation-curable composition).

Particularly suitable crosslinking agents for the subsequent crosslinking are isocyanate compounds. Suitable isocyanate compounds have at least 2 isocyanate groups.

The radiation-curable acrylates and their compositions can be cured thermally, preferably by high-energy radiation, such as UV light or electron beams.

For radiation curing by UV light, photoinitiators are usually added.

Examples of suitable photoinitiators are benzophenone and derivatives thereof, such as alkylbenzophenones, halomethylated benzophenones and Michler's ketone, as well as benzoin and benzoin ethers, such as ethylbenzoin ether, benzil ketals, such as benzil dimethyl ketal, acetophenone derivatives, eg. hydroxy-2-methylphenylpropan-1-one and hydroxycyclohexyl phenyl ketone, anthraquinone and its derivatives, such as methylanthraquinone, and in particular acylphosphine oxides, such as Lucirin® TPO (2,4,6-trimethylbenzoyldiphenylphosphine oxide).

The photoinitiators, which, depending on the intended use of the novel materials, are used in amounts of from 0.1 to 15, preferably from 1 to 10, % by weight, based on the polymerizable components, may be employed as individual substances or, owing to frequent advantageous synergistic effects, in combination with one another.

EXAMPLES

I

Stabilizers and 6.05 g of sulfuric acid were added to 562.8 g of dipropylene glycol, 204.4 g of adipic acid, 443.5 g of acrylic acid and 403 g of methylcyclohexane, and the mixture was heated to 100° C. 152 ml of acrylic acid-containing water (acid number 175.3 mg KOH/g) were removed in the course of 5 hours. The solvent and excess acrylic acid were distilled off until the acid number reached 44.1 mg KOH/g. 154.8 g of bisphenols A diglycidyl ether (Epikote® 828) and 22.9 g of tributylamine were then added at 107° C. Three portions a) to c) of 310 g each were removed from the batch, and the reaction mixtures were then each kept at 107° C. for 4.5 hours, in batch a) 9.3 g of ethylenediamine being added at an acid number of 17.1 mg KOH/g (after a reaction time of 1.5 hours), in batch b) 9.3 g of ethylenediamine being added at an acid number of 9.6 mg KOH/g (after a reaction time of 2.5 hours) and in batch c) 9.3 g of ethylenediamine being added at an acid number of 4.9, after 4.5 hours had elapsed.

The viscosities of the end products are listed in Table 1.

TABLE 1

|  | Acid number on addition of amine | Acid number after end of the reaction in the 2nd stage | Viscosity/Pa · s |
| --- | --- | --- | --- |
| I a) | 17.1 | 6.7 | 11.8 |
| I b) | 9.6 | 4.4 | 17.6 |
| I c)* | 4.9 | 2.6 | 58.2 |

*for comparison

II

Example II was carried out as I but with the following starting materials:

748.8 g of tripropylene glycol, 189.8 g of adipic acid, 411.8 g of acrylic acid, 450.0 g of methylcyclohexane, 6.75 g of sulfuric acid, 25.6 g of tributylamine and 165.6 g of Epikote 828; addition of 7.75 g of ethylenediamine in each case to 310 g of intermediates of stage 1.

The viscosities of the end products are listed in Table 2.

TABLE 2

|  | Acid number on addition of amine | Acid number after end of the reaction in the 2nd stage | Viscosity/Pa · s |
| --- | --- | --- | --- |
| II a) | 15.6 | 6.2 | 7.1 |
| II b) | 9.8 | 4.3 | 8.5 |
| II c)* | 3.7 | 2.7 | 18.6 |

*for comparison

We claim:

1. A process for the preparation of radiation-curable acrylates, wherein, in a 1st stage, a hydroxy compound is reacted with acrylic acid or methacrylic acid and, in a 2nd stage, the reaction product of the 1st stage is subsequently reacted with an epoxy compound and compounds having one or more primary or secondary amino groups are added in or before the 2nd stage and, after the addition of these compounds, the reaction of the 2nd stage is continued until the acid number of the reaction mixture has decreased by at least 3 mg KOH/g of reaction mixture from the time of addition of these compounds.

2. A process as claimed in claim 1, wherein the addition of the compounds having one or more primary or secondary amino groups is carried out at an acid number of from 80 to 8 mg KOH/g.

3. A process as claimed in claim 1, wherein a compound having one or two primary amino groups is added.

4. A process as claimed in claim 1, wherein the hydroxy compound is a saturated polyester which contains at least two hydroxyl groups in the molecule and may also contain ether groups or is a polyether containing at least two hydroxyl groups.

5. A process as claimed in claim 1, wherein the epoxy compound is a diepoxy or triepoxy compound.

6. A radiation-curable acrylate obtainable by a process as claimed in claim 1.

* * * * *